US008638457B2

(12) United States Patent
Cha

(10) Patent No.: US 8,638,457 B2
(45) Date of Patent: Jan. 28, 2014

(54) METHOD OF MANAGING EXCHANGEABLE PART INFORMATION OF AN IMAGE FORMING APPARATUS

(75) Inventor: In Hwan Cha, Seoul (KR)

(73) Assignee: SAMSUNG Electronics Co., Ltd., Suwon-si (KR)

(*) Notice: Subject to any disclaimer, the term of this patent is extended or adjusted under 35 U.S.C. 154(b) by 1572 days.

(21) Appl. No.: 12/023,264

(22) Filed: Jan. 31, 2008

(65) Prior Publication Data

US 2008/0212128 A1 Sep. 4, 2008

(30) Foreign Application Priority Data

Feb. 1, 2007 (KR) ........................ 10-2007-0010667
Jan. 16, 2008 (KR) ........................ 10-2008-0004664

(51) Int. Cl.
*G06F 3/12* (2006.01)

(52) U.S. Cl.
USPC ......................................... 358/1.15; 358/1.16

(58) Field of Classification Search
None
See application file for complete search history.

(56) References Cited

U.S. PATENT DOCUMENTS 6,178,004 B1 * 1/2001 Ochiai ........................ 358/1.14
6,474,771 B2 * 11/2002 Kim ............................... 347/19
6,837,565 B2 * 1/2005 Studholme et al. ............. 347/19
7,490,139 B2 * 2/2009 Deno et al. .................... 709/219
2004/0179215 A1 * 9/2004 Reese et al. .................. 358/1.11
2005/0090229 A1 * 4/2005 Tatsuki et al. ................. 455/406
2005/0243118 A1 * 11/2005 Ward et al. ...................... 347/19
2005/0254834 A1 * 11/2005 Shibui ............................ 399/12
2007/0147853 A1 * 6/2007 Cho et al. ........................ 399/12

FOREIGN PATENT DOCUMENTS

CN 1119716 4/1996
CN 1700114 11/2005
KR 2006-59668 6/2006

OTHER PUBLICATIONS

Chinese Office Action issued Jun. 19, 2009 in CN Application No. 200810085646.9.

* cited by examiner

*Primary Examiner* — Benny Q Tieu
*Assistant Examiner* — Michael Y Tzeng
(74) *Attorney, Agent, or Firm* — Stanzione & Kim, LLP

(57) ABSTRACT

An image forming apparatus, a network system including the same and a management method of parts information of the same capable of matching specific information of an exchangeable part with specific information of the image forming apparatus when the specific information of the exchangeable part is not identical that of the image forming apparatus, is provided. It is determined whether the specific information of the image forming apparatus is identical to that of the exchangeable part. If the specific information of the image forming apparatus is not identical to that of the exchangeable part, at least one specific information of the image forming apparatus or the exchangeable part is changed such that the specific information is identical.

21 Claims, 5 Drawing Sheets

METHOD OF MANAGING EXCHANGEABLE PART INFORMATION OF AN IMAGE FORMING APPARATUS

CROSS-REFERENCE TO RELATED APPLICATIONS

This application claims the benefit of the priority of Korean Patent Application No. 10-2007-0010667 filed on Feb. 1, 2007, in the Korean Intellectual Property Office and No. 10-2008-0004664, filed on Jan. 16, 2008 in the Korean Intellectual Property Office, the disclosure of each of which is incorporated herein by reference in its entirety.

BACKGROUND OF THE INVENTION

1. Field of the Invention

The present general inventive concept relates to an image forming apparatus, a network system including the same and a method of managing part information of the same. More particularly, the present general inventive concept relates to an image forming apparatus, a network system including the same and a method of managing part information of the same capable of normally operating the image forming apparatus even if specific information of an exchangeable part, which is installed in the image forming apparatus, is not identical to specific information of the image forming apparatus.

2. Description of the Related Art

According to the development of an electronic technology, not only a computer but also an image forming apparatus, such as a printer, a scanner, a copy machine and a multi-functional device, is developed and available at a low price with high performance.

In addition, manufacturers of the image forming apparatus provide various services for the image forming apparatus to promote the purchase of their product. As an example of the services, if a user purchasing the product of the manufacturer requests a user account in a homepage of the manufacturer, the manufacturer provides the user with various services, such as an e-mail service, a news service, a web search service and a web hard service.

Meanwhile, since the image forming apparatus actually prints an image on a sheet of paper, the image forming apparatus requires a cartridge. However, when a predetermined time has lapsed, ink or toner is depleted in the cartridge, so that an image forming work cannot be performed. Therefore, the user must frequently exchange the used cartridge with a new cartridge when using the image forming apparatus.

However, in the above image forming apparatus, if a code of the new cartridge is not identical to that of the used cartridge, an error message is displayed and the image forming work can not be performed. That is, in the above image forming apparatus, if country information of the new cartridge is not identical to that of the used cartridge, an error message, such as "Invalid Toner Cartridge", is displayed and the image forming work is stopped.

SUMMARY OF THE INVENTION

The present general inventive concept provides an image forming apparatus, a network system including the same and a method of managing the same capable of matching specific information of an exchangeable part with specific information of the image forming apparatus, if the specific information of the exchangeable part is not identical to that of the image forming apparatus.

Additional aspects and utilities of the present general inventive concept will be set forth in part in the description which follows and, in part, will be obvious from the description, or may be learned by practice of the general inventive concept.

The foregoing and/or other aspects of the present general inventive concept are achieved by providing a method of managing part information of an image forming apparatus, the method including determining whether specific information of the image forming apparatus is identical to specific information of an exchangeable part to be installed in the image forming apparatus, and changing the specific information of the image forming apparatus or the exchangeable part such that the specific information of the image forming apparatus matches with the specific information of the exchangeable part, if the specific information of the image forming apparatus is not identical to the specific information of the exchangeable part.

The specific information may include at least one of country of manufacture information, a serial number and date of manufacture information.

The method may further include displaying an error message when the specific information of the image forming apparatus is not identical to the specific information of the exchangeable part.

The image forming apparatus may change the specific information of the image forming apparatus or the exchangeable part such that the specific information of the image forming apparatus matches with the specific information of the exchangeable part, if the specific information of the image forming apparatus is not identical to the specific information of the exchangeable part.

The method may include requesting a change of specific information permission from the image forming apparatus to a web server when the specific information of the image forming apparatus is not identical to the specific information of the exchangeable part, and outputting a change permission command from the web server to the image forming apparatus according to the request from the image forming apparatus, wherein the image forming apparatus changes the specific information of the image forming apparatus or the exchangeable part when the change permission command is received by the image forming apparatus such that the specific information of the image forming apparatus matches with the specific information of the exchangeable part.

The web server may output the change permission command by encoding the change permission command, and the image forming apparatus may decode the change permission command.

The change of the specific information of the image forming apparatus or the exchangeable part may be a fee-based service.

The foregoing and/or other aspects of the present general inventive concept are also achieved by providing a method of managing part information of a network system, the method includes requesting a change of specific information of an image forming apparatus or an exchangeable part of the image forming apparatus from a terminal apparatus which is connected to the image forming apparatus via a web server, outputting a change permission command from the web server to the image forming apparatus according to the request received from the terminal apparatus, and changing the specific information of the image forming apparatus or the exchangeable part by using the image forming apparatus when the change permission command is received in the image forming apparatus such that the specific information of the image forming apparatus matches with the specific information of the exchangeable part.

The change of the specific information of the image forming apparatus or the exchangeable part may be a fee-based service.

The web server may output the change permission command by encoding the change permission command, and the image forming apparatus may decode the change permission command.

The foregoing and/or other aspects of the present general inventive concept are also achieved by providing an image forming apparatus including a storage unit to store specific information of the image forming apparatus, an exchangeable part installed in the image forming apparatus and having specific information stored in the exchangeable part, and a controller that changes specific information of the image forming apparatus or the exchangeable part such that the specific information of the image forming apparatus matches with the specific information of the exchangeable part, if the specific information of the image forming apparatus is not identical to the specific information of the exchangeable part.

The image forming apparatus may further include a display unit to display an error message when the specific information stored in the storage unit is not identical to the specific information of the exchangeable part.

The foregoing and/or other aspects of the present general inventive concept are also achieved by providing a network system including an image forming apparatus that requests a change of specific information when specific information of an exchangeable part to be installed in the image forming apparatus is not identical to specific information of an exchangeable part previously installed in the image forming apparatus, and a web server that outputs a change permission signal to the image forming apparatus upon the request received from the image forming apparatus, wherein the image forming apparatus changes the specific information of the exchangeable part to be installed in the image forming apparatus when the change permission signal is received from the web server by the image forming apparatus such that the specific information of the exchangeable part to be installed matches with the specific information of the exchangeable part previously installed in the image forming apparatus.

The web server may output the change permission signal by encoding the change permission signal, and the image forming apparatus may decode the change permission signal.

The foregoing and/or other aspects of the present general inventive concept are also achieved by providing a network system including a terminal apparatus that requests a change of specific information of an image forming apparatus or an exchangeable part of the image forming apparatus, a web server that outputs a change permission command to the image forming apparatus upon the request from the terminal apparatus, wherein the image forming apparatus changes the specific information of the exchangeable part or the image forming apparatus when the change permission command is received by the image forming apparatus such that the specific information of the exchangeable part matches with the specific information of the image forming apparatus.

The change of the specific information of the image forming apparatus or the exchangeable part may be available as a fee-based service via the web server.

The foregoing and/or other aspects of the present general inventive concept are also achieved by providing method of managing an image reproduction network, including comparing specific manufacturing information stored in an image forming apparatus to specific manufacturing information stored in a part to be installed in the image forming apparatus, requesting permission to change the compared specific manufacturing information of the image forming apparatus or the compared specific manufacturing information of the part to be installed if the compared manufacturing information is not identical, and changing the manufacturing information of the image forming apparatus or the part to be installed after paying a fee to allow the information change.

The manufacturing information of the image forming apparatus or the part to be installed may be changed only after receiving a permission command.

The fee may be determined based on a cost differential between a cost of manufacture of the image forming apparatus in a country of manufacture of the image forming apparatus compared to a cost of manufacture of the image forming apparatus in a country of usage of the image forming apparatus.

Country of manufacture information of the part to be installed may be changed to be identical to country of manufacture information of the image forming apparatus.

The foregoing and/or other aspects of the present general inventive concept are also achieved by providing a computer readable recording medium having encoded thereon computer instructions that when executed by a computer perform a method of managing part information of an image forming apparatus, including determining whether specific information of the image forming apparatus is identical to specific information of an exchangeable part of the image forming apparatus, and changing the specific information of the image forming apparatus or the exchangeable part such that the specific information of the image forming apparatus matches with the specific information of the exchangeable part, if the specific information of the image forming apparatus is not identical to the specific information of the exchangeable part.

The foregoing and/or other aspects of the present general inventive concept are also achieved by providing an image forming apparatus, including an exchangeable part having specific information, and a controller to compare the specific information with reference information, and to operate the exchangeable part in a printing operation only when a difference between the specific information and the reference information is permitted.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
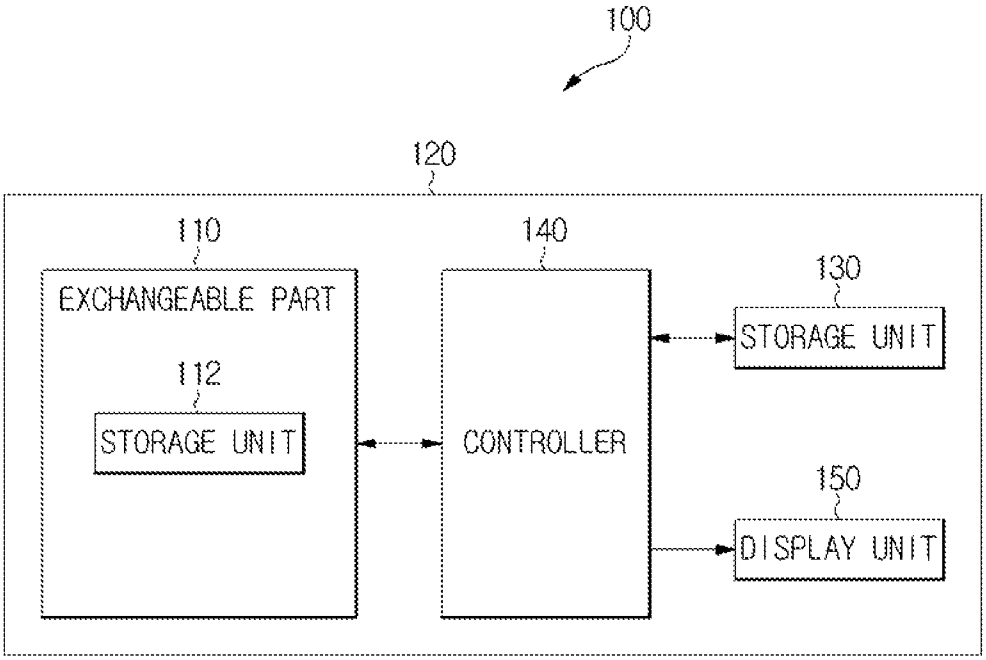
FIG. 1 is a block diagram representing an image forming apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below to explain the present general inventive concept by referring to the figures.

FIG. 1 is a block diagram representing an image forming apparatus according to an embodiment of the present general inventive concept.

As illustrated in FIG. 1, the image forming apparatus 100 includes an exchangeable part 110 and a body 120.

The exchangeable part 110 is provided with a storage unit 112 to store specific information of the exchangeable part 110. The storage unit 112 is a memory, such as a CRUM (Customer Replacement Unit Monitor) memory, and specific information stored therein includes a serial number, manufacturing information and country information of the exchangeable part 110.

The manufacturing information refers to information related to the manufacturing of the image forming apparatus 100, such as a manufacturing date. The country information refers to information related to an area, or a country, in which the exchangeable part 110 is manufactured, and may include a country of manufacture, a country of origin and a delivery country. In addition, the specific information can be stored in a form of, for example, a bar code and/or a radio frequency identification tag. If the specific information of the exchangeable part 110 is stored in the bar code or the radio frequency identification tag, the image forming apparatus 100 may be provided on the body 120 a reader disposed in, or connectable to, the body 120 to read the bar code and/or the radio frequency identification tag. Since a method of reading a bar code and/or a radio frequency identification tag is generally known in the art, the detail of a reader and such a reading method of the reader will be omitted herein.

The body 120 includes a storage unit 130, a controller 140, a display unit 150, and the body 120 is equipped with the exchangeable part 110 disposed in or connected to the body 120.

The storage unit 130 of the body 120 stores specific information of the image forming apparatus 100 and/or the exchangeable part 110. The specific information of the image forming apparatus 100 may include a serial number, manufacturing information (for example, date of manufacture) and country of manufacture information of the image forming apparatus 100. In addition, the specific information of the exchangeable part 110, which is stored in the storage unit 130, may correspond with specific information of an exchangeable part that is initially installed in the image forming apparatus 100 and may include manufacturing information and country of manufacture information of the exchangeable part 110.

The controller 140 compares the specific information of the exchangeable part 110 with the specific information of the storage unit 130 to determine if the specific information of the exchangeable part 110 is identical to the specific information of the storage unit 130. The controller 140 changes at least one specific information of the exchangeable part 110 or the storage unit 130 such that the specific information of the exchangeable part 110 matches with the specific information of the storage unit 130, if the specific information of the exchangeable part 110 is not identical to the specific information of the storage unit 130. That is, the controller 140 changes at least one of the specific information of the exchangeable part 110 or the storage unit 130 such that the compared specific information of the exchangeable part 110 will match with each other without exception the information of the storage unit 130, if the specific information of the exchangeable part 110 is not identical to the specific information of the storage unit 130.

For example, where an image forming apparatus manufactured in Japan is used in Korea, if the country code stored in the storage unit 130 of the image forming apparatus corresponds to Japan and the country code stored in the storage unit 112 of the new exchangeable part 110 corresponds to Korea, the controller 140 changes information of the country code of Japan to be information of the country code of Korea, thereby allowing normal operation of the image forming apparatus 100.

In another embodiment, when specific information of the exchangeable part 110 is not identical to specific information of the storage unit 130, the controller 140 displays an error message on the display unit 150. In this embodiment, it may be possible to change the non-identical specific information only when the user permits the change of the non-identical specific information. Otherwise, normal operation of the image forming apparatus 100 may be prevented.

For example, the controller 140 controls the image forming apparatus 100 such that an error message is displayed on the display unit 150, such as, for example, "The manufacturing country of the image forming apparatus is different from the manufacturing country of the exchangeable part 110. Match the country codes?" The user checking the message simply inputs "Yes" or "No", thereby changing the country code of the exchangeable part 110 or the storage unit 130 and allowing normal operation.

The display unit 150 displays various information and may be any type of electronic visual display apparatus, including a liquid crystal display (LCD), a plasma display panel (PDP), a thin film transistor (TFT) display, an organic electroluminescent (EL) display, or a cathode ray tube (CRT) display. In addition, the display unit 150 may be provided as part of the image forming apparatus 100 or may be realized as a separate displaying unit of another device connected to the image forming apparatus.

Hereinafter, an operation and an effect of the image forming apparatus 100 and a management method thereof according to an embodiment of the present general inventive concept will be described.

Figure 2:
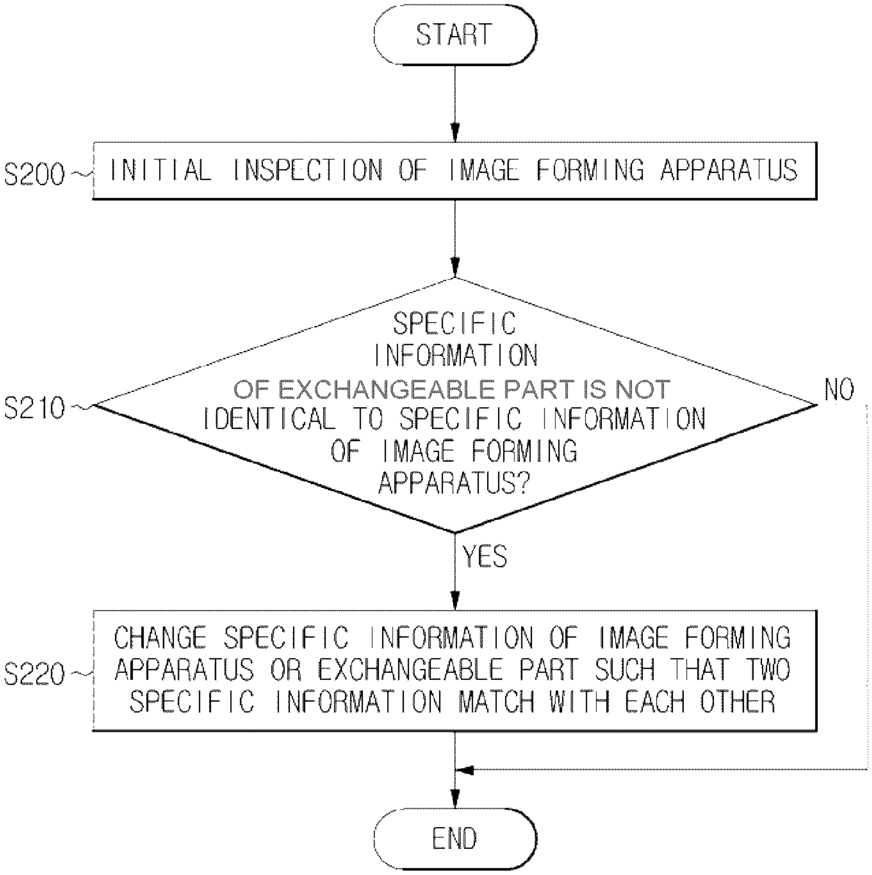
FIG. 2 is a flowchart representing a procedure to manage part information of the image forming apparatus according to an embodiment of the present general inventive concept.

FIG. 2 is a block diagram representing a procedure to manage part information of the image forming apparatus 100 according to an embodiment of the present general inventive concept. As illustrated in FIG. 2, during an initial inspection of an image forming apparatus system (operation S200), the image forming apparatus 100 determines if specific information of the exchangeable part 110 is identical to that stored by the image forming apparatus 100 (operation S210).

If it is determined that specific information of the exchangeable part 110 is not identical to that of the image forming apparatus 100 (referring to 'Yes' in operation S210), at least one specific information of the image forming apparatus 100 or the exchangeable part 110 is changed (operation S220). If specific information of the exchangeable part 110 is not identical to that of the image forming apparatus 100, an error message may be displayed to inform the user of the error state. If the user permits the change of the specific information, specific information of the exchangeable part 110 or the image forming apparatus 100 can be changed so as to be identical to each other. In one example, the change of at least one specific information of the image forming apparatus 100 or the exchangeable part 110 is available as a fee-based service. That is, fee information with respect to the change of the specific information is calculated, for example through a server connected with the image forming apparatus 100, and a fee is imposed according to the calculated fee information.

Hereinafter, a network system according to another embodiment of the present general inventive concept will be described in detail.

Figure 3:
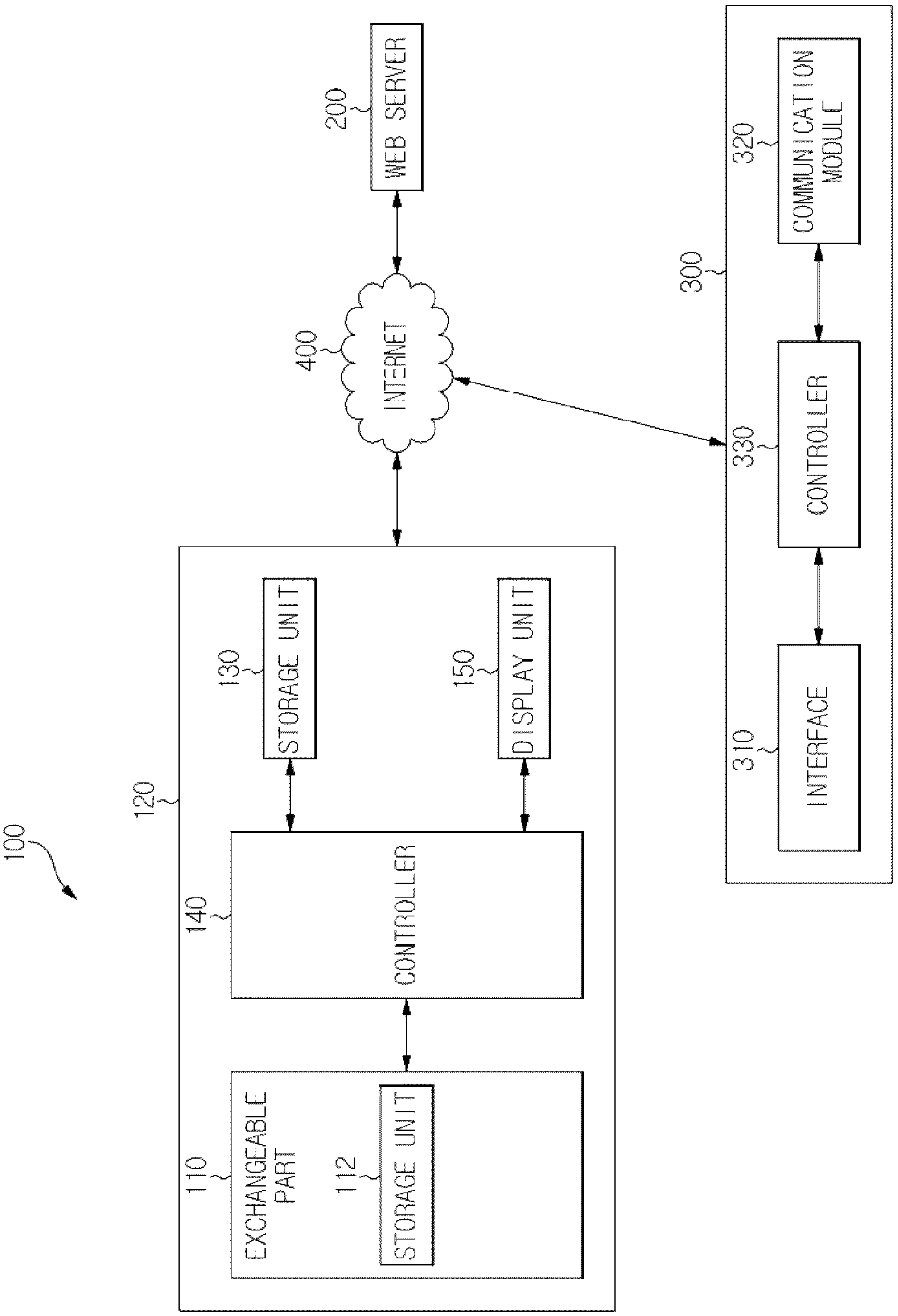
FIG. 3 is a block diagram representing a network system according to another embodiment of the present general inventive concept.

FIG. 3 is a block diagram representing a network system according to another embodiment of the present general inventive concept. As illustrated in FIG. 3, the network system includes an image forming apparatus 100 and a web server 200, which is connected, via a wired or wireless connection, to the image forming apparatus 100 through a network, such as the internet 400.

The image forming apparatus 100 includes an exchangeable part 110 and a body 120.

The exchangeable part 110 is provided with a storage unit 112 to store specific information of the exchange part 110. The storage unit 112 is a memory, such as a CRUM memory, and specific information may include a serial number, manufacturing information and country of manufacture information of the exchangeable part 110.

The body 120 includes a storage unit 130, a controller 140, a display unit 150 and the body 120 is equipped with the exchangeable part 110.

The storage unit 130 stores specific information of the image forming apparatus 100 and/or the exchanging part 110. The specific information of the image forming apparatus 100 may include a serial number, manufacturing information and country of manufacture information of the image forming apparatus 100. In addition, specific information of the exchangeable part 110 corresponds to specific information of an exchangeable part that is initially installed in the image forming apparatus 100 and includes manufacturing information and country of manufacture information of the exchangeable part 100.

The controller 140 compares specific information of the exchangeable part 110 with specific information of the storage unit 130 to determine if the specific information is identical to each other. When the compared specific information are not identical to each other, the controller 140 requests the web server 200 to change at least one specific information of the image forming apparatus 100 or the storage unit 130 such that the specific information of the exchangeable part 110 matches with the specific information of the storage unit 130.

In addition, when the specific information of the exchangeable part 110 is not identical to the specific information of the storage unit 130, the controller 140 may display an error message on the display unit 150. In such an example, the controller 140 requests a change of the specific information such that the compared specific information is matched with each other only when the user permits the change of the specific information. Otherwise, normal operation of the image forming apparatus 100 is prevented.

In addition, the controller 140 may change at least one specific information of the exchangeable part 110 or the storage unit 130 such that the compared specific information is matched with each other when the controller 140 receives a change permission command, which is transmitted from the web server 200 in response to the user request to change the specific information.

As described above, the display unit 150 displays various information and may be an LCD, a PDP display, a TFT display, an organic EL display or a CRT display. In addition, the display unit 150 may be provided as part of the image forming apparatus 100 or may be realized as a separate display unit of another device connected to the image forming apparatus 100.

The web server 200 outputs the change permission command to the image forming apparatus 100 upon receiving the user request to change the specific information of the exchangeable part 110 or the storage unit 130 from the image forming apparatus 100.

That is, if the web server 200 receives the change request command from the image forming apparatus 100 that requests the change of specific information of the exchangeable part 110 or the storage unit 130, the web server 200 reads the change request command and generates a change permission command corresponding to the change request command to output the change permission command to the image forming apparatus 100. In this example, the web server 200 encodes the change permission command by using an encoding module (not illustrated), and the image forming apparatus 100 decodes the change permission command by using a decoding module (not illustrated).

Figure 4:
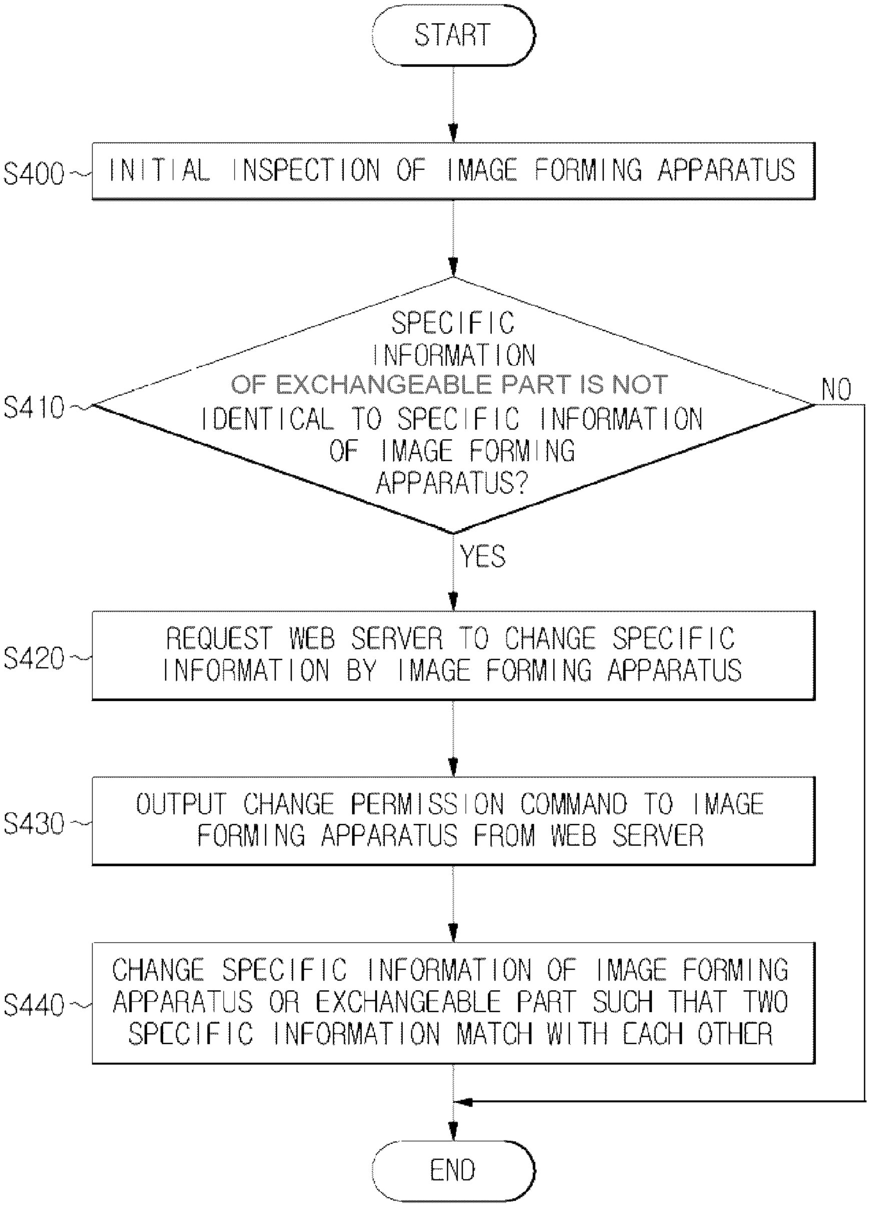
FIG. 4 is a flowchart representing a procedure to manage part information of the network system according to a further embodiment of the present general inventive concept.

FIG. 4 is a flowchart representing a procedure to manage part information of the network system according to another embodiment of the present general inventive concept. As illustrated in FIG. 4, during an initial inspection of the system (operation S400), the image forming apparatus 100 determines if the specific information of the exchangeable part 110 is identical to that of the image forming apparatus 100 (operation S410).

If it is determined that the two specific information are not identical to each other (referring to 'Yes' in operation S410), the image forming apparatus 100 requests the web sever 200 to change the specific information (operation S420).

Upon receiving the request, the web sever 200 outputs the change permission command to the image forming apparatus 100 (operation S430). Thus, the image forming apparatus 100 changes at least one specific information of the image forming apparatus 100 and the exchangeable part 110 such that the specific information of the image forming apparatus 100 matches with that of the exchangeable part 110 (operation S440).

Referring to FIG. 3, the network system according to another embodiment of the present general inventive concept includes a terminal apparatus 300, the web server 200 and the image forming apparatus 100.

The terminal apparatus 300 is connected to an internet 400 through a Local Area Network—(LAN)), an infrastructure network or an ad-hoc network. A user of the terminal apparatus 300 executes a predetermined web browser program and inputs a domain name of the web server 200 on a URL window, thereby accessing the website managed by the web server 200.

Meanwhile, in order to access and use the website, the user of the terminal apparatus 300 has to open an account by inputting information, such as a serial number of the image forming apparatus 100, which ensures that the product is normally purchased, to use various services through the account.

The terminal apparatus 300 includes an interface 310, a communication module 320 and a controller 330.

The interface 310 makes communication with the image forming apparatus 100. In detail, the interface 310 includes a serial interface such as a USB (Universal Serial Bus) interface, a parallel interface and a network interface.

The communication module 320 allows the user of the image forming apparatus 100 to access the web server 200 through a predetermined user account.

The communication module 320 is a component making a wire-communication or a wireless-communication through the internet 400. When the user inputs a domain name of the web server 200 on the URL window or an auto-link function is performed due to a replacement of the exchangeable part

110, the communication module 320 accesses the website which is managed by the web server 200.

The controller 330 receives the request of changing at least one specific information of the image forming apparatus 100 and the exchangeable part 110 and requests the web server 200 to change at least one specific information of the image forming apparatus 100 and the exchangeable part 110.

For example, if the user accesses the web site operated by the web server 200 to request the change of at least one specific information of the image forming apparatus 100 and the exchangeable part 110 after the user checks the error message, the terminal apparatus 300 allows the user to access the website through a user authentication, so that the user can request the change of at least one specific information of the image forming apparatus 100 and the exchangeable part 110.

In addition, the controller 330 receives the request of changing at least one specific information of the image forming apparatus 100 and the exchangeable part 110 and requests the web server 200 to change at least one specific information of the image forming apparatus 100 and the exchangeable part 110.

For example, when the image forming apparatus from abroad is domestically used, if the user accesses the website and connects the terminal apparatus 300 with the image forming apparatus 100, the controller 330 of the terminal apparatus 300 compares the specific information of the image forming apparatus 100 and the exchangeable part 100 with each other to determine if the image forming apparatus 100 is available. If it is determined that the image forming apparatus is unavailable since the specific information of the image forming apparatus 100 is not identical to that of the exchangeable part 110, the change of the specific information is requested to the web server 200 to change the specific information of the image forming apparatus 100 or the exchangeable part 110.

If the change of the specific information of the image forming apparatus 100 or the exchangeable part 110 is requested, the change permission command to permit the change of the image forming apparatus 100 or the exchangeable part 110 is output to the image forming apparatus 100. In this case, the web server 200 encodes the change permission command by using the encoding module.

The change of at least one specific information of the image forming apparatus 100 and the exchangeable part 110 is available as a fee-based service. That is, the web server 200 calculates the fee information by using the specific information of the image forming apparatus 100 and the exchangeable part 110, and controls such that a predetermined fee is imposed according to the calculated fee information.

For example, where an image forming apparatus manufactured in Japan is used in Korea, and if the image forming apparatus manufactured in Japan costs 100,000 Korean won and the image forming apparatus manufactured in Korea costs 120,000 Korean won, then a 20,000 Korean won price difference exists between the two countries (Korea and Japan). Accordingly, the web server 200 controls to impose a fee of 20,000 Korean won on a user of the image forming apparatus manufactured in Japan.

In addition, the web server 200 is set such that the amount of the fee is calculated according to the type of image forming apparatus 100, and imposes the fee corresponding to the calculated amount.

In addition, the web server 200 can impose the fee of the image forming apparatus 100 by adding the fee to a mobile fee or a land line fee through a user authentication. Fees can be imposed using various methods.

For example, a user accesses the web site operated by the web server 200 and inputs the product information of the image forming apparatus 100 to pay the fee. After paying the fee, the change of specific information of the image forming apparatus 100 is requested to generate a change permission command.

When the image forming apparatus 100 receives the change permission command, the image forming apparatus 100 changes at least one specific information of the image forming apparatus 100 or the exchangeable part 110 such that the specific information of the image forming apparatus 100 matches with that of the exchangeable part 110. In this example, if the change permission command, which is output from the web server 200, is an encoded signal, the image forming apparatus 100 decodes the encoded change permission command by using the decoding module.

Figure 5:
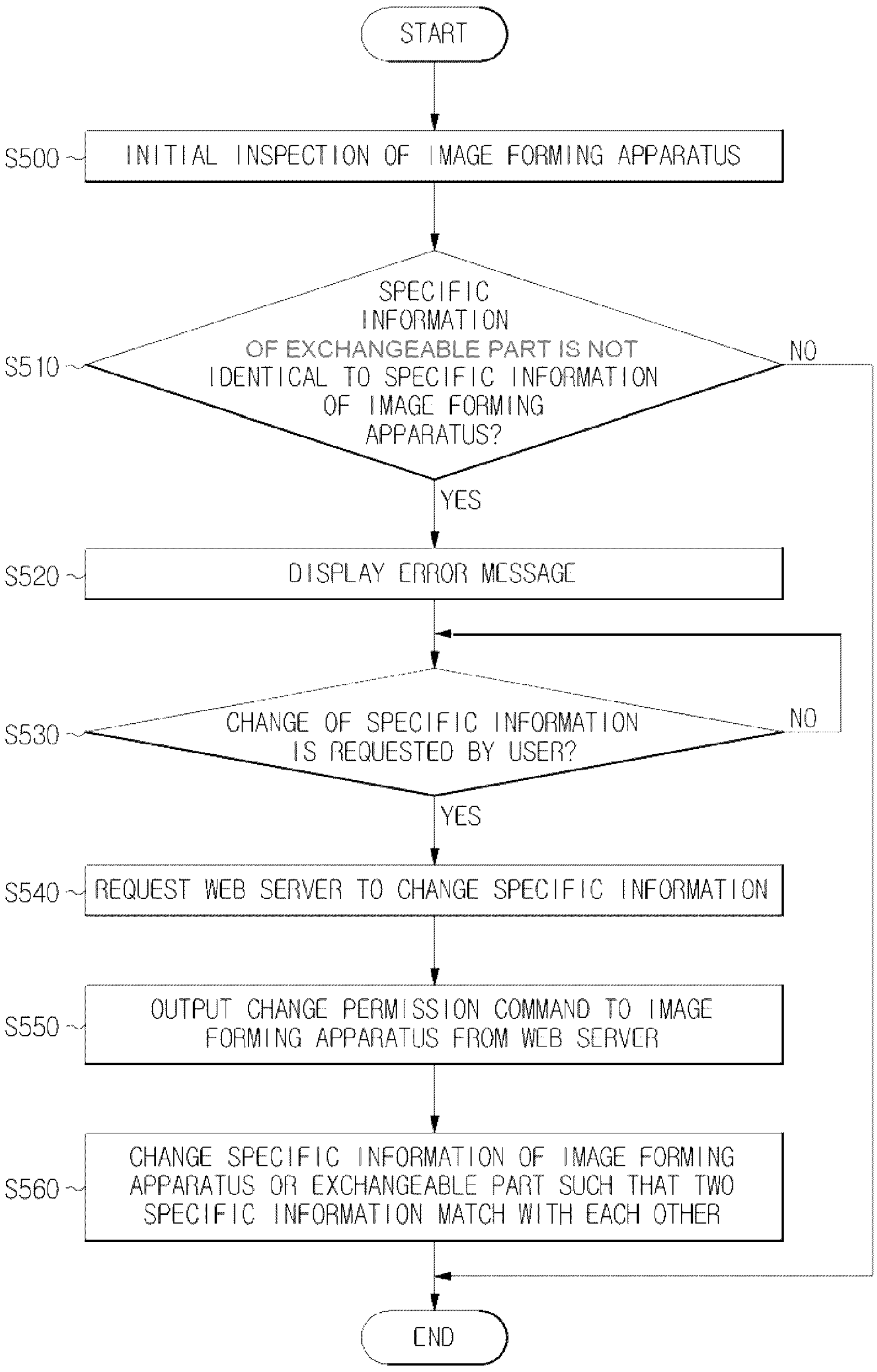
FIG. 5 is a flowchart representing a procedure to manage part information of the network system according to an embodiment of the present general inventive concept.

FIG. 5 is a flowchart representing a procedure to manage part information of the network system according to an additional embodiment of the present general inventive concept. As illustrated in FIG. 5, during an initial inspection of the system (operation S500), the image forming apparatus 100 determines if specific information of the exchangeable part 110 is identical to that of the image forming apparatus (operation S510). If it is determined that the compared specific information is not identical to each other (referring to 'Yes' in S510), an error message is displayed through the display unit 150, thereby informing a user of an error state (operation S520).

After that, the terminal apparatus 300 determines whether the change of specific information is requested (operation S530), and if so, requests the web server 200 to change the specific information as the user has decided to allow a change of the specific information (operation S540).

Upon receiving the change information request, the web sever 200 outputs a change permission command to permit the change of the specific information to the image forming apparatus 100 (operation S550), and the image forming apparatus 100 changes at least one specific information of the image forming apparatus 100 or the exchangeable part 110 such that the compared specific information is identical to each other (operation S560).

According to the image forming apparatus, the network system including the same and a method of managing part information of the same, the image forming apparatus is available for normal operation even if information stored in the image forming apparatus is not identical to information stored in the exchangeable part. That is, for example, the image forming apparatus manufactured in country different than the country of usage can be used in normal operation by exchanging the exchangeable part manufactured in the country of usage of the image forming apparatus after specific information has been changed of the image forming device or of the exchangeable part.

Further, according to an embodiment of the present general inventive concept, when changing specific information of the exchangeable part or the image forming apparatus, a change permission command to change information stored in the image forming apparatus into the information stored in the exchangeable part which corresponds to the exchangeable part may be encoded, thereby improving security.

Further, according to an embodiment of the present general inventive concept, if a price of the image forming apparatus is different between manufacturing and usage countries, the price difference can be compensated by imposing the price difference as a user fee.

The exchangeable part 110 of the image forming apparatus 100 may be, for example, an ink or toner cartridge, a developer unit, a photosensitive unit, a portion of a printing unit to form an image on a print medium, or one or more components to form the image in the image forming apparatus or to communicate with an external device. Any conventional exchangeable or replaceable part can be used as the exchangeable part 100. The exchangeable part 110 may be a portion of a printing unit which may include a feeding unit and a discharge unit to feed the printing medium to form the image on the fed print medium. The controller 140 controls the printing unit to perform a printing operation using the exchangeable part 110 according to a determination of whether a difference of compared specific information is changeable or allowable.

The present general inventive concept can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A method of managing part information of an image forming apparatus, the method comprising:

determining whether first specific information of the image forming apparatus is identical to second specific information of an exchangeable part to be installed in the image forming apparatus;

changing the first specific information of the image forming apparatus or the second specific information of the exchangeable part by change of the specific information permission from a web server such that the first specific information of the image forming apparatus matches with the second specific information of the exchangeable part, if the first specific information of the image forming apparatus is not identical to the second specific information of the exchangeable part, wherein the exchangeable part includes at least one of an ink cartridge, a toner cartridge, a developer unit, a photosensitive unit, a print medium feeding unit and a print medium discharge unit; and outputting a change permission command from the web server to the image forming apparatus according to the request from the image forming apparatus, wherein the image forming apparatus changes the first specific information of the image forming apparatus or the second specific information of the exchangeable part when the change permission command is received by the image forming apparatus such that the first specific information of the image forming apparatus matches with the second specific information of the exchangeable part.

2. The method as claimed in claim 1, wherein the first and second specific information includes at least one of country of manufacture information, a serial number and date of manufacture information.

3. The method as claimed in claim 1, further comprising:

displaying an error message when the first specific information of the image forming apparatus is not identical to the second specific information of the exchangeable part.

4. The method as claimed in claim 1, wherein the image forming apparatus changes the first specific information of the image forming apparatus or the second specific information of the exchangeable part such that the first specific information of the image forming apparatus matches with the second specific information of the exchangeable part, if the first specific information of the image forming apparatus is not identical to the second specific information of the exchangeable part.

5. The method as claimed in claim 1, further comprising:

requesting the change of specific information permission from the image forming apparatus to the web server when the first specific information of the image forming apparatus is not identical to the second specific information of the exchangeable part.

6. The method as claimed in claim 5, wherein the web server outputs the change permission command by encoding the change permission command, and permission command.

7. The method as claimed in claim 1, wherein the change of the first specific information of the image forming apparatus or the second specific information of the exchangeable part is a fee-based service.

8. A method of managing part information of a network system, the method comprising: requesting a change of first specific information of an image forming apparatus or second specific information of an exchangeable part of the image forming apparatus from a terminal apparatus which is connected to the image forming apparatus via a web server;

outputting a change permission command from the web server to the image forming apparatus according to the request received from the terminal apparatus; and changing the first specific information of the image forming apparatus or the second specific information of the exchangeable part by using the image forming apparatus when the change permission command is received in the image forming apparatus such that the first specific information of the image forming apparatus matches with the second specific information of the exchangeable part, wherein the exchangeable part includes at least one of an ink cartridge, an toner cartridge, a developer unit, a photosensitive unit, a print medium feeding unit and a print medium discharge unit.

9. The method as claimed in claim 8, wherein the change of the first specific information of the image forming apparatus or the second specific information of the exchangeable part is available to a user as a fee-based service on the web server.

10. The method as claimed in claim 8, wherein the web server outputs the change permission command by encoding the change permission command, and the image forming apparatus decodes the change permission command.

11. An image forming apparatus, comprising:

a storage unit to store first specific information of the image forming apparatus;

an exchangeable part installed in the image forming apparatus and having second specific information stored in the exchangeable part; and a controller that, upon output of a change permission command from a web server to the image forming apparatus according to a request from the image forming apparatus, changes the first specific information of the image forming apparatus or the second specific information of the exchangeable part by change of the specific information permission from the web server such that the first specific information of the image forming apparatus matches with the second specific information of the exchangeable part, if the first specific information of the image forming apparatus is not identical to the second specific information of the exchangeable part, wherein the exchangeable part includes at least one of an ink cartridge, an toner cartridge, a developer unit, a photosensitive unit, a print medium feeding unit and a print medium discharge unit.

12. The apparatus as claimed in claim 11, further comprising:

a display unit to display an error message when the first specific information stored in the storage unit is not identical to the second specific information of the exchangeable part.

13. A network system, comprising:

an image forming apparatus that requests a change of first specific information when the first specific information of a first exchangeable part to be installed in the image forming apparatus is not identical to second specific information of a second exchangeable part previously installed in the image forming apparatus; and a web server that outputs a change permission signal to the image forming apparatus upon the request received from the image forming apparatus, wherein the image forming apparatus changes the first specific information of the first exchangeable part to be installed in the image forming apparatus when the change permission signal is received from the web server by the image forming apparatus such that the first specific information of the first exchangeable part to be installed matches with the second specific information of the second exchangeable part previously installed in the image forming apparatus, wherein the first exchangeable part includes at least one of an ink cartridge, an toner cartridge, a developer unit, a photosensitive unit, a print medium feeding unit and a print medium discharge unit.

14. The network system as claimed in claim 13, wherein the web server outputs the change permission signal by encoding the change permission signal, and the image forming apparatus decodes the change permission signal.

15. A network system, comprising:

a terminal apparatus that requests a change of first specific information of an image forming apparatus or second specific information of an exchangeable part of the image forming apparatus;

a web server that outputs a change permission command to the image forming apparatus upon the request from the terminal apparatus, wherein the image forming apparatus changes the second specific information of the exchangeable part or the first specific information of the image forming apparatus when the change permission command is received by the image forming apparatus from the web server such that the second specific information of the exchangeable part matches with the first specific information of the image forming apparatus, wherein the exchangeable part includes at least one of an ink cartridge, an toner cartridge, a developer unit, a photosensitive unit, a print medium feeding unit and a print medium discharge unit.

16. The network system as claimed in claim 15, wherein the change of the first specific information of the image forming apparatus or the second specific information of the exchangeable part is available as a fee-based service via the web server.

17. A method of managing an image reproduction network, comprising:

comparing first specific manufacturing information stored in an image forming apparatus to second specific manufacturing information stored in a part to be installed in the image forming apparatus;

requesting permission to change the compared first specific manufacturing information of the image forming apparatus or the compared second specific manufacturing information of the part to be installed to a web server if the compared first and second specific manufacturing information is not identical; and changing, upon output of a change permission command from the web server to the image forming apparatus according to the request from the image forming apparatus, wherein the image forming apparatus changes the first specific manufacturing information of the image forming apparatus or the second specific manufacturing information of the exchangeable part when the change permission command is received by the image forming apparatus such that the first manufacturing specific information of the image forming apparatus matches with the second specific manufacturing information of the part to be installed after paying a fee to allow the information change, wherein the part includes at least one of an ink cartridge, an toner cartridge, a developer unit, a photosensitive unit, a print medium feeding unit and a print medium discharge unit.

18. The method of claim 17, wherein the fee is determined based on a cost differential between a cost of manufacture of the image forming apparatus in a country of manufacture of the image forming apparatus compared to a cost of manufacture of the image forming apparatus in a country of usage of the image forming apparatus.

19. The method of claim 17, wherein country of manufacture information of the part to be installed is changed to be identical to country of manufacture information of the image forming apparatus.

20. A non-transitory computer readable recording medium having encoded thereon computer instructions that when executed by a computer perform a method of managing part information of an image forming apparatus, comprising:

determining whether first specific information of the image forming apparatus is identical to second specific information of an exchangeable part of the image forming apparatus; and changing, upon output of a change permission command from a web server to the image forming apparatus according to a request from the image forming apparatus, wherein the image forming apparatus changes the first specific information of the image forming apparatus or the second specific information of the exchangeable part by change of the specific information permission from the web server such that the first specific information of the image forming apparatus matches with the second specific information of the exchangeable part, if the first specific information of the image forming apparatus is not identical to the second specific information of the exchangeable part, wherein the exchangeable part includes at least one of an ink cartridge, an toner cartridge, a developer unit, a photosensitive unit, a print medium feeding unit and a print medium discharge unit.

21. An image forming apparatus, comprising:

an exchangeable part having specific information; and a controller to compare the specific information with reference information of the image forming apparatus, to change, upon output of a change permission command from a web server to the image forming apparatus according to a request from the image forming apparatus, the reference information of the image forming apparatus or the specific information of the exchangeable part when the change permission command is received by the image forming apparatus such that the reference information of the image forming apparatus matches with the specific information of the exchangeable part, and to operate the exchangeable part in a printing operation only when a difference between the specific information and the reference information is permitted from the web server, wherein the exchangeable part includes at least one of an ink cartridge, an toner cartridge, a developer unit, a photosensitive unit, a print medium feeding unit and a print medium discharge unit.

* * * * *